United States Patent
Karlowsky

(10) Patent No.: US 12,446,614 B2
(45) Date of Patent: Oct. 21, 2025

(54) APPARATUS FOR TRANSFERRING HERB MATERIAL FROM A GRINDER

(71) Applicant: Charlton Karlowsky, St. Agathe (CA)

(72) Inventor: Charlton Karlowsky, St. Agathe (CA)

(*) Notice: Subject to any disclaimer, the term of this patent is extended or adjusted under 35 U.S.C. 154(b) by 882 days.

(21) Appl. No.: 17/703,086

(22) Filed: Mar. 24, 2022

(65) Prior Publication Data

US 2023/0217986 A1 Jul. 13, 2023

Related U.S. Application Data

(60) Provisional application No. 63/297,343, filed on Jan. 7, 2022.

(51) Int. Cl.
*A24C 5/42* (2006.01)
*A24B 7/00* (2006.01)
*A24F 9/00* (2006.01)

(52) U.S. Cl.
CPC ............... *A24C 5/42* (2013.01); *A24B 7/00* (2013.01); *A24F 9/00* (2013.01)

(58) Field of Classification Search
CPC .............. A24C 5/42; A24B 7/00; A24F 9/00
USPC .................................................. 294/180, 176
See application file for complete search history.

(56) References Cited

U.S. PATENT DOCUMENTS

| | | | | |
|---|---|---|---|---|
| 1,330,548 A | * | 2/1920 | Nowack | A47J 43/281 294/180 |
| 2,812,784 A | * | 11/1957 | Palmer | A47L 13/52 15/257.3 |
| 3,255,570 A | * | 6/1966 | Weimer | B65B 67/04 53/390 |
| 4,800,875 A | * | 1/1989 | Ray | A61F 2/4601 606/92 |
| D463,723 S | * | 10/2002 | Sigueiros | 294/176 |
| D802,036 S | * | 11/2017 | Kesselman | D27/194 |
| D827,395 S | * | 9/2018 | Shymkus | D7/691 |
| 2006/0087136 A1 | * | 4/2006 | Pearl | A47F 13/08 294/176 |
| 2011/0266817 A1 | * | 11/2011 | Lipscomb | A01K 1/0114 294/1.3 |

* cited by examiner

*Primary Examiner* — Paul T Chin
(74) *Attorney, Agent, or Firm* — Adrian D. Battison; Ade & Company Inc.; Ryan W. Dupuis

(57) ABSTRACT

A transfer device for material such as cannabis is provided for use with a grinding device and includes a flexible sheet material formed or molded around a hollow interior to define a generally tubular body which has a base wall and two side walls standing upwardly from the base wall. One end of the generally tubular body forms a scraper edge where the sides are recessed to form a shovel area over the base. The other end of the body forms a pinch end where the side walls converge to an upper slot which can be squeezed together to close the slot in a pinching action so as to pinch the material within the hollow interior between the side walls for manual transfer. The body is narrower at the second end so that material scraped into the body is converged by the side walls in the form of a funnel.

13 Claims, 4 Drawing Sheets

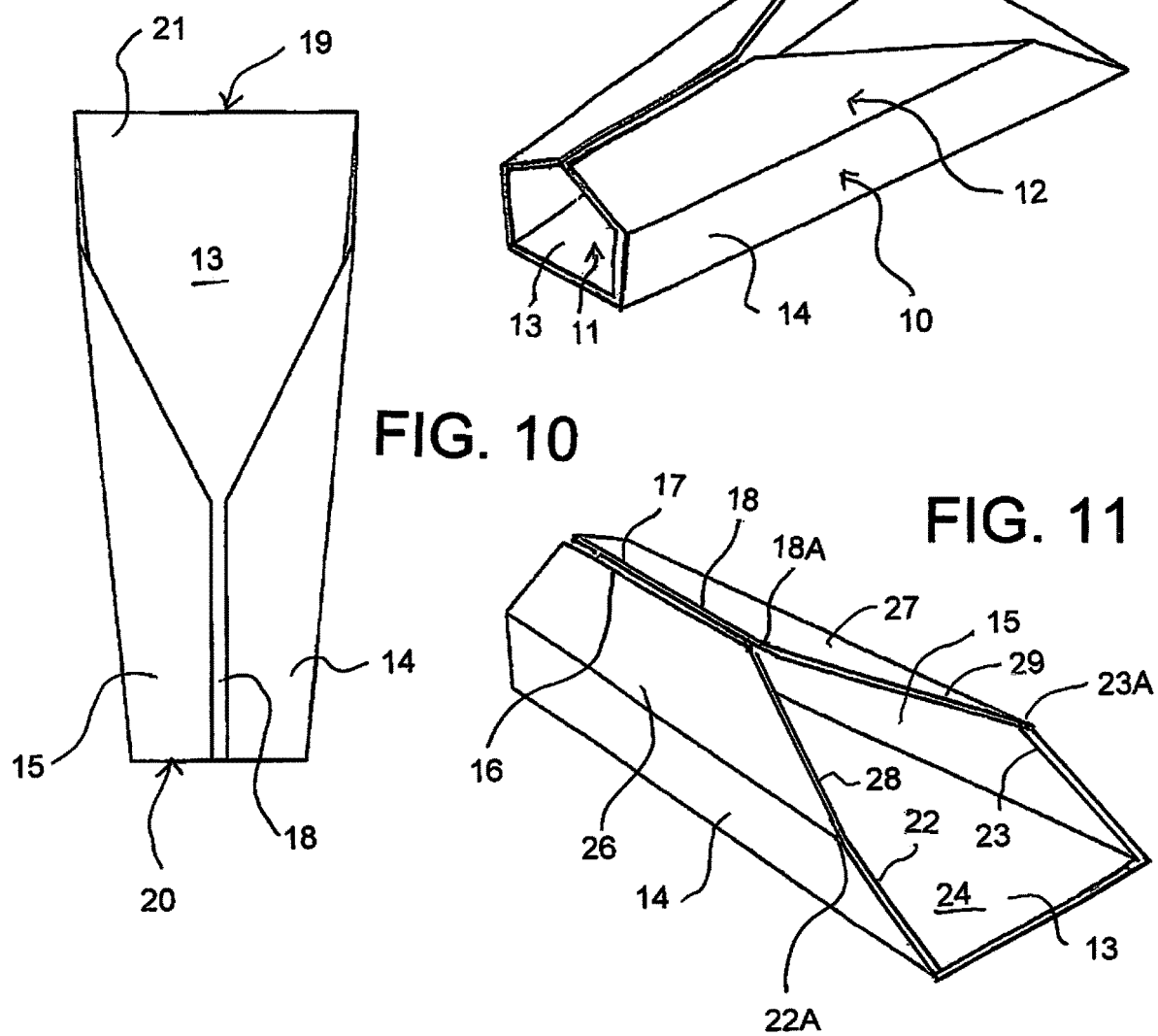

APPARATUS FOR TRANSFERRING HERB MATERIAL FROM A GRINDER

This application claims the benefit under 35 USC 119 (e) of provisional application 63/297,343 filed Jan. 7, 2022.

This invention relates to an apparatus for transferring herb material such as cannabis or tobacco from a grinding device to an end use location such as a paper rolling machine, a pipe or other smoking appliance.

BACKGROUND OF THE INVENTION

Herb grinders are widely available for grinding plant material such as cannabis and tobacco and have become more widely used in the legalization of cannabis products which has occurred in many countries and states. The grinder incudes a rotating component which directs the material through a screen to collect the more desirable components such as the keif particles from the resin glands of the plant. These contain a majority of the active ingredients and are preferably separated for most effective use.

The grinder typically includes a filter which separates the main body of the plant material from a chamber into which the collected material falls.

One problem that arises when using a herb grinder, is that there is no device available that can clean the screen that sifts the finer Keif particles to the bottom chamber. The second issue noticed is that there is no device that can transfer the organic matter without the use of the user's fingers. This contaminates the organic matter with contaminants from hands. It will also contaminate the hands with organic matter.

It is one object of the present invention to provide a Multi tool designed for use with tobacco and cannabis which assists with scraping the material through the filter screen and with collecting the material from the chamber for transfer to the end use location.

SUMMARY OF THE INVENTION

According to the invention there is provided an apparatus for use in transferring herb material such as cannabis or tobacco from a grinding device to an end use location, the apparatus comprising:
- a sheet material formed around a hollow interior to define a generally tubular body which has a base wall and two side walls standing upwardly from the base wall;
- the two side walls converging to respected edges thereof spaced from the base wall to define an open slot between the side edges;
- the generally tubular body having a first scraper end and a second end spaced from the scraper end;
- the generally tubular body having open ends at both the first scraper end and at the second end;
- the base wall at the scraper end forming a generally flat scraper edge across the base wall projecting from the scraper end so that the tubular body can be grasped manually to operate the scraper body in a scraping action over a filter surface of the grinding device;
- the tubular body being formed of a semi-rigid flexible material so that the side walls at least adjacent the second end can be squeezed together at the open slot in a pinching action so as to pinch the material within the hollow interior between the side walls for manual transfer.

In one embodiment, preferably the tubular body is narrower at the second end so that material scraped into the tubular body at the scraper end is converged by the side walls in the form of a funnel.

In one embodiment, preferably the base wall extending from the scraper end to the second end is flat and continuous.

In one embodiment, preferably the side walls extend from a position at or adjacent the scraper end to the second end.

In one embodiment, preferably the side walls at or adjacent the scraper end are recessed away from the scraper end to form an open shovel area above the base wall.

In one embodiment, preferably the side walls at or adjacent the scraper end extend upwardly from the scraper edge at the base wall to an upper edge thereof which is inclined upwardly and rearwardly from the scraper edge at the base wall.

In one embodiment, preferably the side walls at a position remote from the scraper end each include a second converging wall portion which is inclined upwardly and inwardly toward the slot and which converging wall portions each have a leading edge inclined upwardly and rearwardly of the scraper edge.

In one embodiment, preferably the leading edges of the converging wall portions are inclined upwardly and rearwardly of the scraper edge toward the slot where the slot has a forward most portion spaced rearwardly of the scraper edge to define the open shovel portion above the base wall.

In one embodiment, preferably the side walls at or adjacent the second end include a converging portion extending upwardly and inwardly above the base wall so as lie closely adjacent at the second end to form the slot where the converging portion and the side walls can be squeezed to pinch the material on the base wall.

In one embodiment, preferably the side walls and converging portion extending are sufficiently flexible to allow the side walls to be squeezed to pinch the material on the base wall by closing the slot.

In one embodiment, preferably the side walls at or adjacent the second end include a first upstanding portion attached to the base wall and a second converging portion extending upwardly and inwardly from an upper edge of the first portion above the base wall so as to form the slot therebetween.

In one embodiment, preferably the side walls are sufficiently flexible to allow the side walls to be squeezed to pinch the material on the base wall by closing the slot.

In one embodiment, preferably the first upstanding portions diverge from the base wall to the upper edge thereof.

According to a second aspect, the invention provides an ornamental design for a herb transfer apparatus, as shown and described.

The sheet material can be made from a flexible plastics material which retains its shape except when squeezed and for this purpose a PVC is suitable which can be typically 0.76 mm thick PVC.

The tool thus constructed has four specific possible uses:

Use 1

The shovel or wider scraper end is used to scrape the screen of the grinder, which helps the finer Keif particles drop through the screen.

Use 2

The Shovel End, after scraping is complete, can be used to scoop in the organic matter into the hollow interior. The body is held manually and operated to move the scraper end as a pick up surface to slide the material from the container over the outer edge of the scraper into the hollow interior from which it can be transferred back out through the scraper end by sliding from the hollow interior into a rolling device or other end use location such as rolling papers.

Use 3

The tubular body is then reversed so that the opposite end or Pinching End can be used to scoop in organic materials. This is then held in place by squeezing the side walls together with the thumb and index finger to pinch the sides of the device labelled Flap A and B. This holds the organic matter in the device until transferred to next device. The user then lets go of Flap A and B to release the pinching or squeezing action and the organic matter drops out of the device into the container.

Use 4

The user scoops organic matter in the Shovel or scraper end, puts the container on the Pinching End and tilts the device up and the organic materials funnel to the end use location by sliding through the hollow interior while being converged by the side walls in the form of a funnel.

It will be appreciated that the invention can be defined herein either in terms of its structure as defined above or in terms of its functions or method of operation to carry out the four functions or uses defined.

Also it will be appreciated that the shape of the device or tool can itself be of an importance to be protected as a design in its own right.

BRIEF DESCRIPTION OF THE DRAWINGS

FIG. 9 is a first isometric view of one embodiment of a tool according to the present invention shown from the rear and one side.

FIG. 10 is a second isometric view of one embodiment of a tool according to the present invention shown from the front and the opposite.

FIG. 11 is a top plan view of the embodiment of FIG. 1 of a tool according to the present invention.

DETAILED DESCRIPTION

Figure 1:
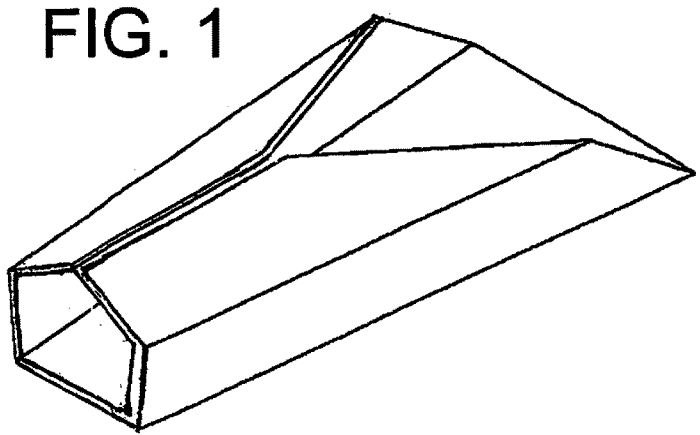
FIG. 1 is a first isometric view of one embodiment of a tool according to the present invention shown from the rear and one side and showing the design.
Figure 3:
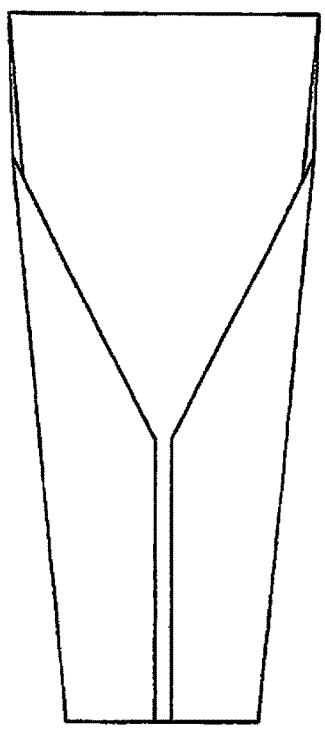
FIG. 3 is a top plan view of the embodiment of FIG. 1 of a tool according to the present invention and showing the design.
Figure 2:
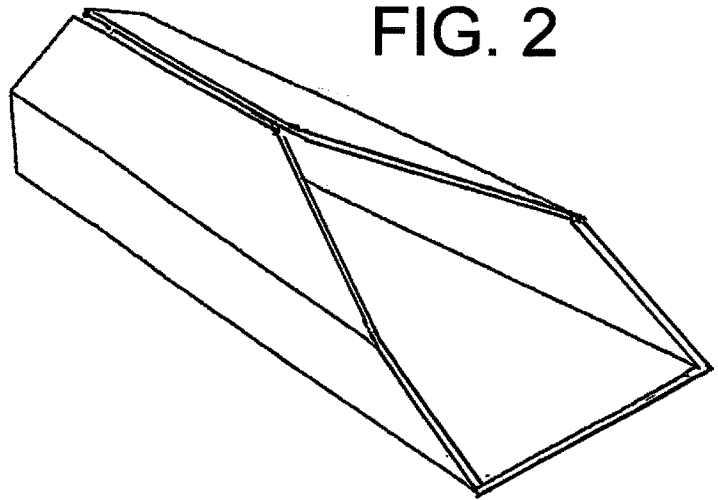
FIG. 2 is a second isometric view of one embodiment of a tool according to the present invention shown from the front and the opposite side and showing the design.
Figure 4:
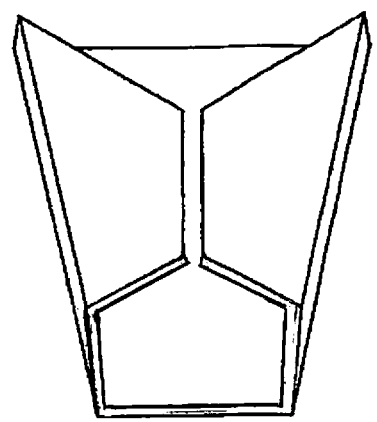
FIG. 4 is a further isometric view of one embodiment of a tool according to the present invention shown from the rear and showing the design.
Figure 5:
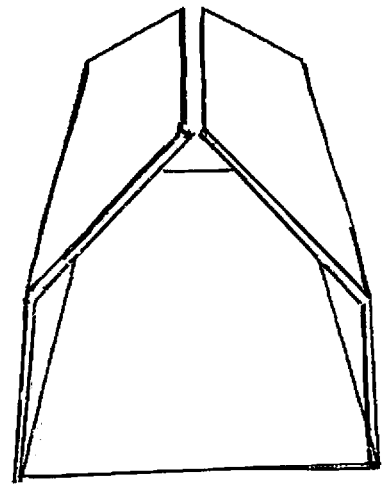
FIG. 5 is a further isometric view of one embodiment of a tool according to the present invention shown from the front and showing the design.
Figure 6:
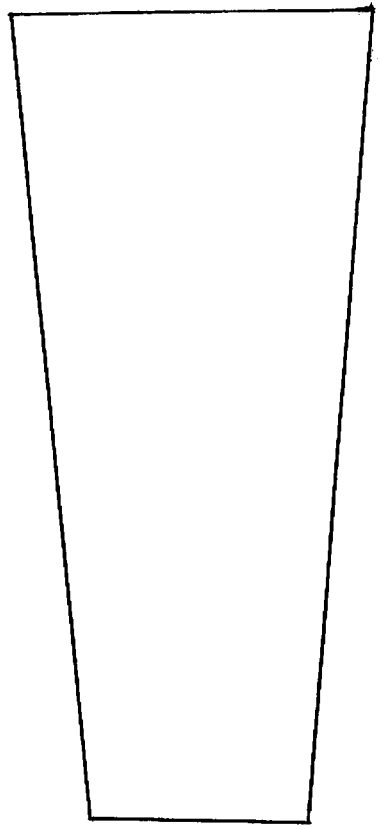
FIG. 6 is a bottom plan view of the embodiment of FIG. 1 of a tool according to the present invention and showing the design.
Figure 7:
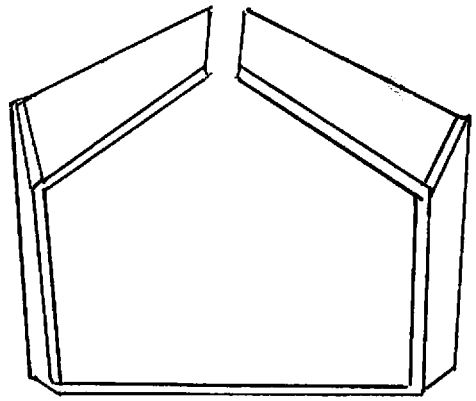
FIG. 7 is rear elevational view of the embodiment of FIG. 1 of a tool according to the present invention and showing the design.
Figure 8:
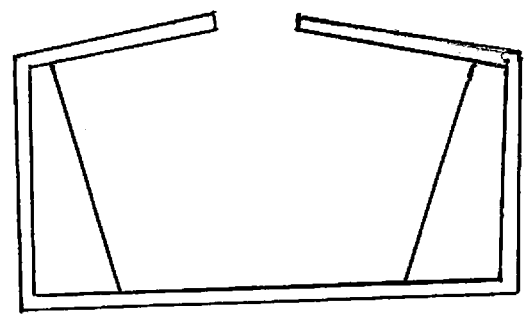
FIG. 8 is front elevational view of the embodiment of FIG. 1 of a tool according to the present invention and showing the design.

The apparatus shown in FIGS. 9 to 11 is designed for use in transferring cannabis from a grinding device to an end use location. The apparatus is formed by a sheet material 10 formed around a hollow interior 11 to define a generally tubular body 12 which has a base wall 13 and two side walls 14 and 15 standing upwardly from the base wall 13.

The sheet material can be formed by many suitable processes including injection molding or thermal forming so that it is not intended that the sheet material necessarily be supplied in flat form and wrapped, but instead any forming technique can be used which ends up defining a body with a continuous wall of a generally constant thickness defining the base and side walls as described hereinafter.

The two side walls 14 and 15 converge upwardly and inwardly to respected top edges 16 and 17 thereof spaced from the base wall 13 to define an open slot 18 between the side edges 16 and 17.

The generally tubular body 12 defines a first scraper end 19 and a second pinching end 20. Both ends are open at both the first scraper end and at the second pinching end to allow the entry of the material to be transferred.

The base wall at the scraper end forms a generally flat scraper edge 21 across the base wall 13 projecting forwardly at the scraper end so that the tubular body can be grasped manually to operate the scraper edge in a scraping action over a filter surface of the grinding device.

The tubular body is narrower at the second end as shown in FIG. 10 so that the base wall 13 converges gradually so that material scraped into the tubular body at the scraper end is converged by the side walls in the form of a funnel.

The side walls 14 and 15 at or adjacent the scraper end extend upwardly from the scraper edge 21 at the base wall to an upper edge 22, 23 thereof which is inclined upwardly and rearwardly from the scraper edge at the base wall. Thus a point 22A, 23A on the upper edges is recessed away from the scraper edge to form an open shovel area 24 above the base wall and between the recessed side walls.

The side walls 14, 15 at the position 22A, 23A remote from the scraper end each include a second converging wall portion 26, 27 which is inclined upwardly and inwardly toward the slot 18. The converging walls 26, 27 lie at an angle to the lower sections of the side walls 14, 15 so as to converge more sharply. The lower portions may be at right angles to the base or may slightly diverge. The converging wall portions 26, 27 each have a leading edge 28, 29 inclined upwardly and rearwardly of the scraper edge. And converging in a V-shape to the slot 18 at an apex 18A. In this way the upper portions are further recessed away from the edge 21 to further define the shovel area 24.

The leading edges 28, 29 of the converging wall portions 26, 27 are inclined upwardly and rearwardly of the scraper edge toward the slot 18 where the slot has a forward most portion 18A spaced rearwardly of the scraper edge 21 to define the open shovel portion 24 above the base wall 13.

The side walls 14, 15 at or adjacent the second pinching end 20 include the converging portions 26, 27 extending upwardly and inwardly above the base wall 13 so as lie closely adjacent at the second end 20 to form the slot 18. The side walls 14, 15 and converging portions 26, 27 extending therefrom are sufficiently flexible to allow the side walls to be squeezed to pinch the material on the base wall by closing the slot 18 or even overlapping the side edges defining the slot.

The tubular body being formed of a sems-rigid flexible material so that the side walls can be squeezed together at the open slot in a pinching action so as to pinch the material within the hollow interior between the side walls for manual transfer.

The sheet material can be made from a flexible plastics material which retains its shape except when squeezed and for this purpose a PVC is suitable which can be typically 0.76 mm thick PVC.

The tool thus constructed can be used where the shovel or wider scraper end 21 is used to scrape the screen of the grinder, which helps the finer Keif particles drop through the screen. The Shovel End, after scraping is complete, can be used to scoop in the organic matter into the hollow interior. The body is held manually and operated to move the scraper end as a pick up surface to slide the material from the container over the scraper edge 21 into the hollow interior 11 from which it can be transferred back out through the scraper end 19 by sliding from the hollow interior into an end use location. The tubular body can also be reversed in the hand so that the pinching end 20 can be used to scoop in organic materials. This is then held in place by squeezing the side walls together with the thumb and index finger to pinch the sides of the device. This holds the organic matter in the device until transferred to an end use location. The user then lets go of the side walls to release the pinching or squeezing action and the organic matter drops out of the device into the container. The user can also scoop the organic matter into the scraper end and discard the material collected through the second end 20 by sliding through the hollow interior while being converged by the side walls in the form of a funnel.

The invention claimed is:

1. An apparatus for use in transferring herb material from a grinding device to an end use location, the apparatus comprising:
    a sheet material formed around a hollow interior to define a generally tubular body which has a base wall and two side walls standing upwardly from the base wall;
    the two side walls converging to respected edges thereof spaced from the base wall to define an open slot between the side edges;
    the generally tubular body having a first scraper end and a second end spaced from the scraper end;
    the generally tubular body having open ends at both the first scraper end and at the second end;
    the base wall at the scraper end forming a generally flat scraper edge across the base wall projecting from the scraper end so that the tubular body can be grasped manually to operate the scraper body in a scraping action over a filter surface of the grinding device;
    the tubular body being formed of a semi-rigid flexible material so that the side walls at least adjacent the second end can be squeezed together at the open slot in a pinching action so as to pinch the material within the hollow interior between the side walls for manual transfer.

2. The apparatus according to claim 1 wherein the tubular body is narrower at the second end so that material scraped into the tubular body at the scraper end is converged by the side walls in the form of a funnel.

3. The apparatus according to claim 1 wherein the base wall extending from the scraper end to the second end is flat and continuous.

4. The apparatus according to claim 1 wherein the side walls extend from a position at or adjacent the scraper end to the second end.

5. The apparatus according to claim 1 wherein the side walls at or adjacent the scraper end are recessed away from the scraper end to form an open shovel area above the base wall.

6. The apparatus according to claim 5 wherein the side walls at or adjacent the scraper end extend upwardly from the scraper edge at the base wall to an upper edge thereof which is inclined upwardly and rearwardly from the scraper edge at the base wall.

7. The apparatus according to claim 6 wherein the side walls at a position remote from the scraper end each include a second converging wall portion which is inclined upwardly and inwardly toward the slot and which converging wall portions each have a leading edge inclined upwardly and rearwardly of the scraper edge.

8. The apparatus according to claim 7 wherein the leading edges of the converging wall portions are inclined upwardly and rearwardly of the scraper edge toward the slot where the slot has a forward most portion spaced rearwardly of the scraper edge to define the open shovel portion above the base wall.

9. The apparatus according to claim 1 wherein the side walls at or adjacent the second end include a converging portion extending upwardly and inwardly above the base wall so as lie closely adjacent at the second end to form the slot where the converging portion and the side walls can be squeezed to pinch the material on the base wall.

10. The apparatus according to claim 9 wherein the side walls and converging portion extending are sufficiently flexible to allow the side walls to be squeezed to pinch the material on the base wall by closing the slot.

11. The apparatus according to claim 1 wherein the side walls at or adjacent the second end include a first upstanding portion attached to the base wall and a second converging portion extending upwardly and inwardly from an upper edge of the first portion above the base wall so as to form the slot therebetween.

12. The apparatus according to claim 11 wherein the side walls are sufficiently flexible to allow the side walls to be squeezed to pinch the material on the base wall by closing the slot.

13. The apparatus according to claim 11 wherein the first upstanding portions diverge from the base wall to the upper edge thereof.

* * * * *